UNITED STATES PATENT OFFICE.

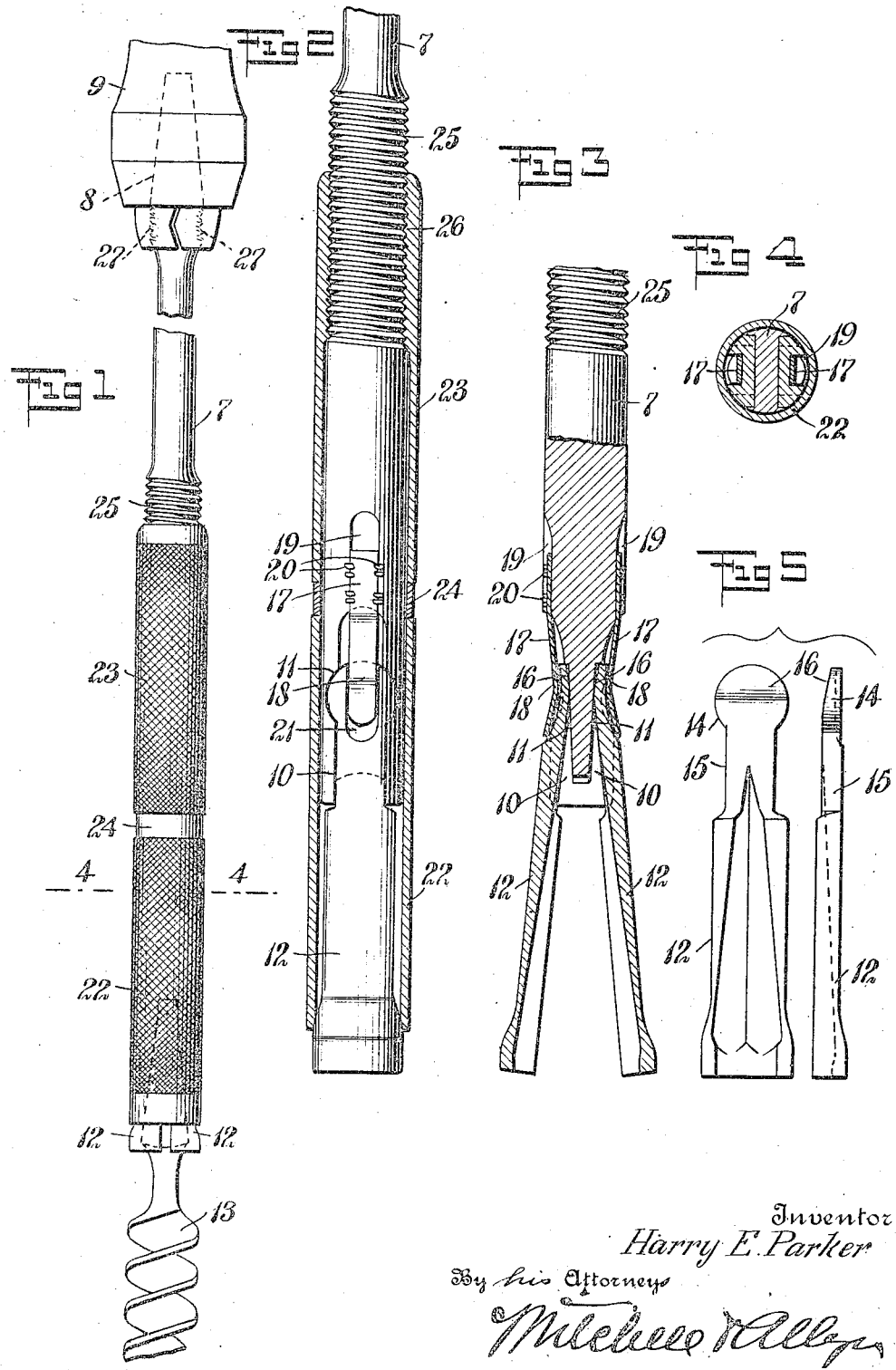

HARRY E. PARKER, OF NEW BRITAIN, CONNECTICUT, ASSIGNOR TO THE STANLEY RULE & LEVEL COMPANY, OF NEW BRITAIN, CONNECTICUT, A CORPORATION OF CONNECTICUT.

BIT-BRACE EXTENSION.

1,241,143.  Specification of Letters Patent.  Patented Sept. 25, 1917.

Application filed January 17, 1917. Serial No. 142,811.

*To all whom it may concern:*

Be it known that I, HARRY E. PARKER, a citizen of the United States of America, residing at New Britain, Hartford county, State of Connecticut, have invented a new and useful Bit-Brace Extension, of which the following is a specification.

The present invention is an extension device for bits, augers and other boring tools and the general objects of the invention are to provide a simple inexpensive and substantially constructed device of this character in which the boring tool may be readily and firmly secured and which will be of a size to follow the boring tool into the cut being made.

Other objects are to provide a simple construction of jaw parts in which the opposite jaws may be made as duplicates instead of right and left-hand jaws as heretofore, to enable an easy assembling or disassembling of the jaws and to prevent the jaws being accidently loosened or opened in the course of boring operations.

In the accomplishment of these objects I employ a tool shank having a suitable driving for engagement in the chuck of a brace or other boring device and provide this shank with seats in opposite sides of the end portion thereof to receive duplicate jaw parts, said seats comprising preferably longitudinal inwardly extending grooves or channels receiving shank portions on the jaws and having enlargements receiving enlarged head portions on the ends of the jaws, these head portions on the jaws having a pivoting action in their seats and being detachably held in place therein by springs mounted on the tool shank. The jaws are closed by a jaw closing member sleeved on the tool shank and having preferably a left-handed screw threaded engagement therewith so as to exert a tightening effect upon the jaws when the same engages with the walls of the bore in which the tool is working.

Other features and details of construction will appear as the specification proceeds, attention being directed to the accompanying drawing wherein I illustrate the invention embodied in a practical and preferred form.

In said drawing:

Figure 1, is a view of the tool in side elevation, the intermediate portion of the shank being broken away, the driving head in the upper end of the shank being shown engaged in a tool chuck and the jaws of the bit extension being shown holding an auger as in the normal use of the device.

Fig. 2, is an enlarged detail view of the lower jaw or chuck end of the tool, with the jaw closing mechanism shown in section.

Fig. 3, is a sectional view of the tool shank and chuck taken on a plane at right angles to the plane of Fig. 2.

Fig. 4, is a cross-sectional view taken substantially on the plane of the line 4—4 of Fig. 1.

Fig. 5, is a view illustrating one of the duplicate chuck jaws in front and edge relations.

The shank or body of the tool is designated 7, the same being of any desired length and being usually provided at one end with a driving head such as that indicated at 8, adapted to be held in a chuck such as indicated at 9 of a brace or other boring device.

At the opposite or chuck end the shank 7 is formed with seats for holding the chuck jaws, said seats comprising in the illustration longitudinal slots or channels 10 in the opposite sides of the shank extending inward from the end thereof and provided with lateral enlargements or seats 11 disposed inward from the end of the shank.

12 designates the jaws of the tool constructed to hold the driving end of the bit or other boring device such as that indicated at 13. These jaws are unique in that they are made as exact duplicates of each other, thus avoiding the necessity heretofore experienced of having separate parts or castings for the right-hand and left-hand jaws.

The jaws are provided at their ends with enlargements or heads 14 of a size to fit easily within the enlarged seats 11 provided therefor in the sides of the tool shank and with reduced shank portions 15 guided within the longitudinal grooves or channels 10 provided in the opposite sides of the shank. In the illustration the heads 14 are substantially circular, the seats 11 therefor being of corresponding shape and the inner faces of the heads may be beveled or rounded off as indicated at 16 so as to have a rocking or pivotal engagement in the seats.

The chuck jaws are held in place on the tool shank by means, comprising in the construction illustrated, springs 17 having inwardly directed portions 18 bearing on the backs or outer exposed faces of the jaw heads near the ends thereof, such springs thereby having the effect as indicated in Fig. 3 of rocking the jaws on the rounded or beveled bearing surfaces described so as to swing the outer ends of the jaws apart or into separated relation.

The springs are shown secured to the tool shank by mounting them in grooves or channels 19 which are in effect narrow continuations or extensions of the grooves in which the jaws are seated, the springs being shown held therein by integral lugs or extensions 20 indented from the side walls of the grooves over the tops of the springs. The head portions of the jaws are further shown provided with grooves 21 forming bearing seats for those portions of the springs engaged therewith.

The jaws are closed upon the tool by means comprising, in the present instance, a jaw closing sleeve 22 slidably engaged over the tool shank and forced into closing engagement with the jaws by a screw threaded sleeve 23, also engaged on the tool shank, a thrust receiving washer 24 being preferably interposed between the adjoining ends of these two sleeve members.

The screw threaded engagement between the operating sleeve 23, which is in effect, an operating nut and the shank of the tool is clearly illustrated in Fig. 2, the same comprising a left-handed screw threaded portion 25 on the shank with which the similarly left-handed screw threaded portion 26 of the operating sleeve engages. With this construction it is necessary to turn the jaw closing sleeve left handedly to close the jaws, the result of which is that any friction by engagement of said sleeve with the walls of the bore in which the tool is operating has a tendency to further close the jaws rather than loosen them. This is exceedingly valuable in working in deep cuts.

The driving head 8 of the tool which is usually of squared shape is preferably made large enough to constitute a stop or abutment preventing the sleeves from sliding off the tool shank when the sleeve 23 has been turned far enough to disengage it from the screw threaded portion 25. This prevents the parts from becoming lost. To enable the separation of the parts when such is desired I have shown the corners of the driving head screw threaded as indicated at 27 in correspondence with the left-handed screw threads 25 so that the sleeve 23 may be removed by rotating it over this screw threaded abutment head. The jaw engaging sleeve 22 is of sufficiently large internal diameter to slide over the threaded portions of the shank so that the parts will all slip off the end of the shank when the threaded sleeve has been disengaged therefrom as described.

In constructing the device the lower end of the tool shank may be made all of one diameter and slightly larger than the upper portion of the shank, the left-handed screw threads being cut in the upper end of this enlarged portion, the screw threaded sleeve having its upper threaded end of reduced diameter to fit this threaded portion and its lower portion of the same diameter as the jaw engaging sleeve and thrust ring so as to freely work over the non-threaded portion of the enlarged part of the shank.

The advantages of the invention will be apparent from the foregoing, it being seen that the tool is very simple and practical and that it is easily handled and adapted for any place where an extension of the boring tool is needed. The making of the jaws as duplicate parts is of great utility in cheapening the construction of the tool and facilitating the assemblage of the same. The manner of mounting the jaws on the shank of the tool is of great advantage in that while the jaws may be readily slipped into place and as easily be withdrawn, said jaws are firmly held and cannot possibly pull out or become disengaged from the shank when the tool is in use. Another advantage is the relatively small compact construction of the tool which enables the tool to follow the bit into the cut being made.

What I claim is:

1. A tool chuck comprising a shank having longitudinal grooves in opposite sides thereof and extending inwardly from the end of the shank, said grooves being laterally enlarged at points inward from the end of the shank to form enlarged seats at the inner ends of the grooves, jaws having shank portions guided in the longitudinal slots and laterally enlarged heads engaged in the seats aforesaid, said heads thereby holding the jaws against longitudinal withdrawal from the grooves and said heads having a pivoting action in the seats, provided therefor to enable opening and closing movement of the jaws, springs bearing on the jaw heads to hold them engaged in the seats provided therefor and jaw closing means engaging over the jaws.

2. A tool chuck comprising a shank having a threaded portion disposed at a point inward from the end thereof and grooves in opposite sides thereof with laterally enlarged seats at the inner ends of said grooves, jaws mounted at the end of the shank engaged in said grooves having heads at the ends thereof pivotally engaged in the enlarged seats aforesaid, a jaw closing sleeve slidably engaged over the tool shank at a point between the jaws thereon and the threaded portion, and an internally threaded operating sleeve engaged over the threaded portion of the tool shank and arranged to force the slidable jaw closing sleeve longitudinally over the jaws.

3. A tool chuck comprising a shank having a threaded portion disposed at a point inward from the end thereof and grooves in opposite sides thereof with laterally enlarged seats at the inner ends of said grooves, jaws mounted at the end of the shank engaged in said grooves having heads at the ends thereof pivotally engaged in the enlarged seats aforesaid, a jaw closing sleeve slidably engaged over the tool shank at a point between the jaws thereon and the threaded portion, an internally threaded operating sleeve engaged over the threaded portion of the tool shank and arranged to force the slidable jaw closing sleeve longitudinally over the jaws and a loose thrust ring interposed between the adjoining ends of the jaw closing sleeve and the threaded operating sleeve.

4. A tool chuck comprising a shank having longitudinal channels in opposite sides thereof extending inward from the end of the shank and provided with enlarged portions disposed inward from the end of the shank and reduced portions extending inward from said enlarged portions, jaws having shank portions guided in the outer portions of the channels and laterally enlarged heads on the ends of said shank portions having rounded under surfaces bearing in the enlarged portions of the channels, springs secured in the reduced portions of the channels at the inner ends of the enlargements therein and bearing on the enlarged head portions at the ends of the jaws, said head portions having grooves in the outer faces thereof receiving the springs aforesaid and said springs projecting inwardly into engagement with the end portions of the jaws to thereby rock the curved heads of the jaws in their seats and separate the outer ends of the jaws and jaw closing means for said jaws.

HARRY E. PARKER.

Copies of this patent may be obtained for five cents each, by addressing the "Commissioner of Patents, Washington, D. C."